Aug. 11, 1959 C. J. BARECKI 2,898,976
SAFETY EQUIPMENT FOR VEHICLE OCCUPANTS
Filed April 29, 1957 2 Sheets-Sheet 1

INVENTOR
Chester J. Barecki
BY John S. Braddock
ATTORNEY

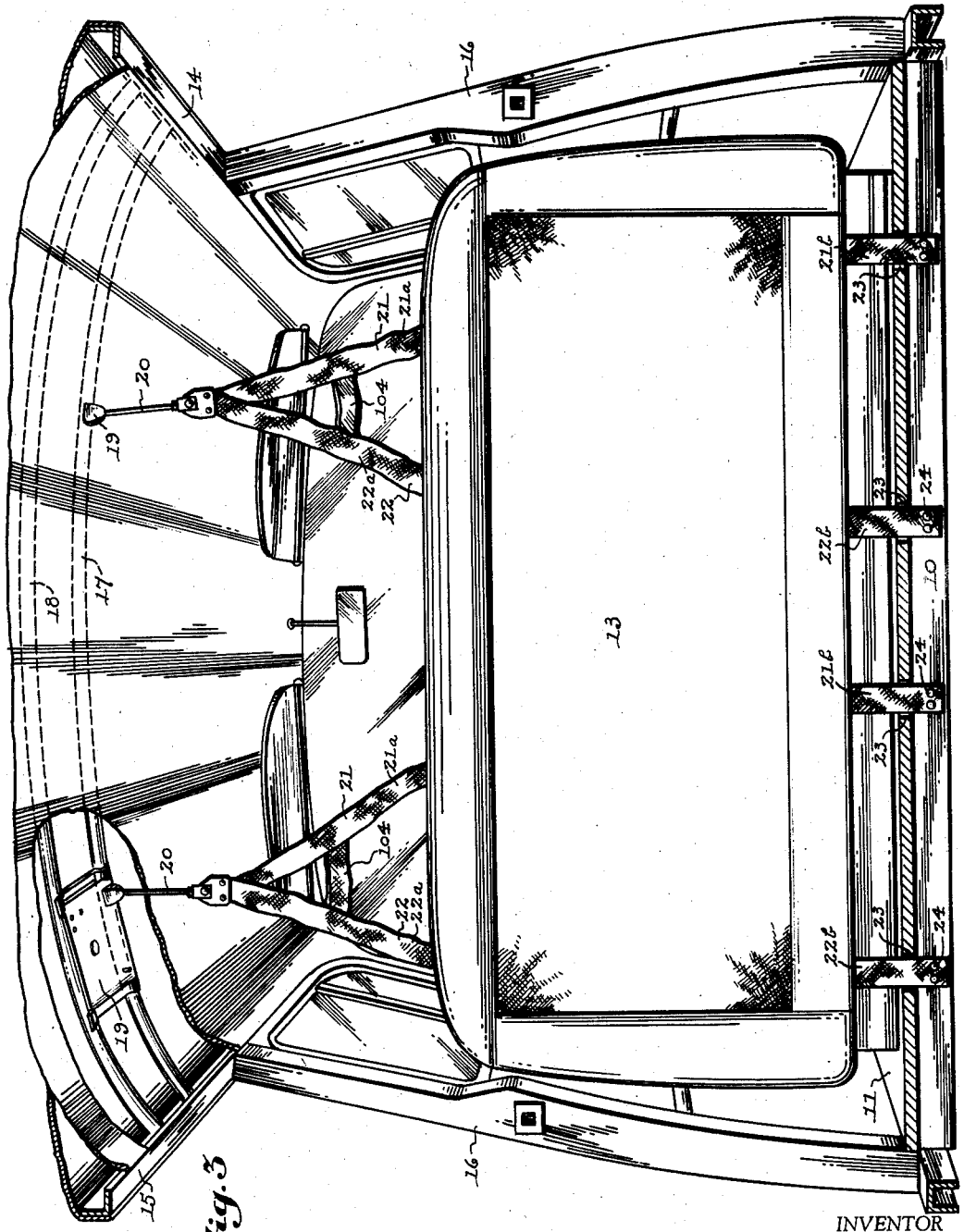

2,898,976
SAFETY EQUIPMENT FOR VEHICLE OCCUPANTS

Chester J. Barecki, Grand Rapids, Mich., assignor to American Seating Company, Grand Rapids, Mich., a corporation of New Jersey Application April 29, 1957, Serial No. 655,693

7 Claims. (Cl. 155—189)

The present invention relates to safety equipment for vehicle occupants. This application is a continuation-in-part of my co-pending application Serial No. 607,709, filed September 4, 1956.

The primary objects of the invention are to provide safety equipment whereby the occupants of moving vehicles, particularly automobiles, are prevented from being suddenly thrown forward in the vehicle in the event of a crash, thus to prevent such occupants from being seriously injured or killed by impact against parts of the vehicle; to provide such safety equipment which in its operation is not dependent on the vehicle seat, which is usually inadequately anchored to the floor, but which is secured to and dependent on the vehicle's frame itself; to provide such safety equipment which includes a shoulder harness and a lap belt for restraining a vehicle occupant against forward movement in the event of a crash, and which also includes a head strap in back of the occupant's head to prevent whipping of his head rearwardly in case the vehicle rebounds from a head-on crash or is struck from the rear by another vehicle; and to provide such safety equipment which when installed in an automobile or other vehicle presents a neat appearance and which is particularly efficient in its intended use.

An illustrative embodiment of the invention is shown in the accompanying drawings, wherein:

Figure 3 is a transverse vertical sectional view of the framing of the vehicle and looking forwardly therein toward the back of the front seat.

Figure 1:
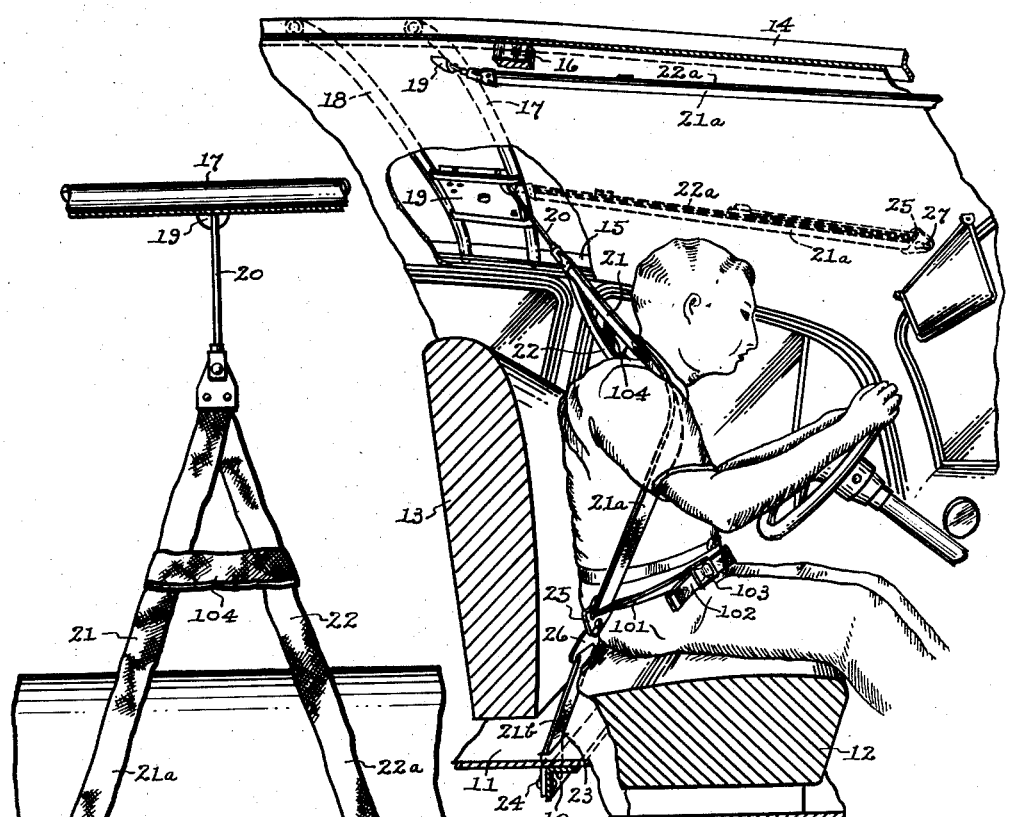
Figure 1 is a fragmentary perspective view of the interior of a motorcar with two sets of the new safety equipment installed therein for the use of the front seat passenger and the driver of the vehicle.
Figure 2:
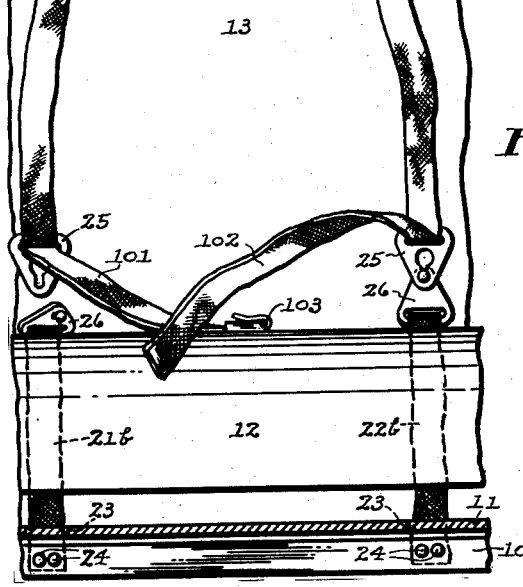
Figure 2 is a fragmentary view partly in front elevation and partly in vertical section, of parts of the vehicle and the front seat therein, and the new safety equipment associated therewith.

Referring now in detail to these drawings and referring first particularly to Figure 1, the steel frame of the vehicle there shown includes floor supports and ceiling supports. One of the transverse angle-bar floor supports is shown in the drawing and is designated 10. The vehicle floor 11, chair seat 12 and chair back 13 are mounted on the floor supports. Ceiling supports, here shown as forwardly-rearwardly extending side angle-bars 14, 15, are rigidly connected to the floor supports and to other parts of the frame by uprights 16.

According to the invention, a pair of spaced transverse tubular metal bars 17, 18 span the vehicle's ceiling, being welded at their opposite ends to the ceiling supports 14, 15. The bars 17, 18 serve as additional ceiling supports and further strengthen the vehicle's frame, and they also serve as mountings for the inertia-locking cable takeup reels generally designated 19. As here shown two of the reels 19 are provided, one for each of two occupants of the vehicle's front seat 12.

An elongated, flexible, non-elastic restraining element is provided for each chair occupant, each of said elements comprising a cable 20 connected to a reel 19 and to a shoulder harness which is bifurcated to provide separate shoulder straps 21, 22 which extend forwardly and around the chair occupant's shoulders as shown. The lower ends of the shoulder straps 21, 22 pass through slots 23 in the vehicle's floor and are secured as by means of rivets 24 to the floor support 10. Thus the restraining elements are connected to the ceiling support and to the floor support of the vehicle rearwardly of the occupants with the intermediate portions thereof extending forwardly and around the occupant's shoulders, so that the occupants may be restrained from being thrown forwardly in the vehicle in the event of a crash or upon abrupt deceleration of the vehicle for other cause. Unlike other safety devices this new arrangement is not dependent on the seat moorings, which often have been found inadequate, to restrain the occupant against forward movement, because the restraining elements are connected directly to the vehicle's frame at both top and bottom.

Each of the shoulder harness straps 21, 22 may for convenience be divided at the approximate level of the chair seat into two parts, the upper parts of the straps being designated 21a and 22a, and the lower parts thereof being designated 21b and 22b. These parts have co-operative pin-and-keyhole attachment fittings 25, 26 respectively by means of which they may quickly be connected and disconnected. When the harness is not in use, the fittings 25 may be attached to pins 27 in the forward ceiling of the car so that upper parts 21a and 22a of the restraining element are up against the ceiling and out of the way, as shown.

I provide a lap belt for the chair occupant which, per se, is of more or less conventional form and which extends between the intermediate portions of the restraining elements. The straps 101, 102 of the lap belt are connected to the fittings 25 on the shoulder harness straps 21a, 22a respectively, and the strap 101 is provided with the conventional buckle 103. I also provide a head strap 104 which extends between the shoulder straps 21a, 22a behind the occupant's head.

Details of one of the automatic inertia-locking cable takeup reels 19 are fully shown and described in my co-pending application Serial No. 607,709, filed September 4, 1956. However, for the purposes of this application it is sufficient to say that each takeup reel is adapted to take up slack in the restraining element associated therewith, to pay out said element in response to forward movements of the chair occupant under normal travel conditions, and to automatically lock against paying out upon abrupt deceleration of the vehicle. Details of other automatic reels for performing these functions are disclosed in the following United States patents: No. 2,071,903, issued February 23, 1937, to John J. Shively; No. 2,480,335, issued August 30, 1949, to Walter E. Nordmark; and No. 2,650,655, issued September 1, 1953, to William R. Neahr et al. Any of these patented devices could without substantial modification be substituted for the reel 19 shown to complete the new combination herein claimed.

It will thus be seen that the invention provides safety equipment for vehicle occupants which comprises shoulder harness and lap belt for restraining an occupant against forward movement and consequent injury or death from impact in the event of a crash, and which also comprises a head strap for preventing rearward whipping of the occupant's head which might result in a broken neck. It will further be seen that all parts of the safety equipment are securely anchored to the frame of the vehicle, rather than to a seat or other object within the vehicle, and thus providing optimum protection for vehicle occupants.

While but one specific embodiment of the invention

I claim:

1. In combination with a vehicle having a forwardly facing chair therein and a frame including a rigid floor support below the chair and a rigid ceiling support above the chair: an elongated flexible non-elastic restraining element for the chair occupant having one end thereof connected to the ceiling support above and rearwardly of the occupant and the other end thereof connected to the floor support below and rearwardly of the occupant, the intermediate portion of said element extending forwardly and around the chair occupant's shoulder to restrain the occupant from being thrown forwardly in the vehicle upon abrupt deceleration of the vehicle.

2. The combination defined by claim 1 characterized by having one end of said elongated flexible non-elastic restraining element connected to its support by means of a safety device adapted to take up slack in said element, to pay out said element in response to forward movement of the chair occupant, and to automatically lock against paying out upon abrupt deceleration of the vehicle.

3. The combination defined by claim 1 characterized by having said elongated flexible non-elastic restraining element bifurcated to provide portions extending around both of the chair occupant's shoulders.

4. The combination defined by claim 3 characterized by having a head strap extending between the bifurcations of said restraining element behind the occupant's head.

5. The combination defined by claim 3 characterized by having a lap belt for the chair occupant extending between the bifurcations of said restraining element.

6. The combination defined by claim 1 characterized by having said elongated flexible non-elastic restraining element divided at the approximate level of the chair seat into two parts, the upper and lower parts having co-operative attaching means whereby they may be connected and disconnected.

7. The combination defined by claim 6 characterized by having means on the vehicle's ceiling for retaining the upper part of said elongated element up against the ceiling when not in use.

References Cited in the file of this patent

UNITED STATES PATENTS

| | | |
|---|---|---|
| 2,212,746 | Nunn | Aug. 27, 1940 |
| 2,365,626 | Carlisle | Dec. 19, 1944 |
| 2,475,588 | Bierman | July 12, 1949 |
| 2,480,335 | Nordmark | Aug. 30, 1949 |
| 2,576,867 | Wilson | Nov. 27, 1951 |
| 2,661,221 | Lockwood | Dec. 1, 1953 |
| 2,705,586 | Young | Apr. 5, 1955 |
| 2,740,642 | Atwood | Apr. 3, 1956 |